(12) United States Patent
Sonoura

(10) Patent No.: US 8,180,104 B2
(45) Date of Patent: May 15, 2012

(54) TRACKING METHOD AND TRACKING APPARATUS

(75) Inventor: Takafumi Sonoura, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1143 days.

(21) Appl. No.: 12/010,765

(22) Filed: Jan. 29, 2008

(65) Prior Publication Data

US 2008/0193009 A1 Aug. 14, 2008

(30) Foreign Application Priority Data

Feb. 8, 2007 (JP) .................................. 2007-29424

(51) Int. Cl.
*G06K 9/00* (2006.01)
(52) U.S. Cl. .......................... 382/103; 700/245; 700/259
(58) Field of Classification Search .................. 382/103, 382/106; 348/135, 169; 701/28; 901/47; 700/245, 259
See application file for complete search history.

(56) References Cited

U.S. PATENT DOCUMENTS

| | | | | |
|---|---|---|---|---|
| 4,907,169 A | * | 3/1990 | Lovoi | 700/259 |
| 5,903,680 A | * | 5/1999 | De Haan et al. | 382/265 |
| 6,556,722 B1 | * | 4/2003 | Russell et al. | 382/291 |
| 6,809,760 B1 | * | 10/2004 | Takagi et al. | 348/211.9 |
| 2002/0031242 A1 | * | 3/2002 | Yasui et al. | 382/104 |
| 2003/0152271 A1 | * | 8/2003 | Tsujino et al. | 382/190 |
| 2003/0235327 A1 | * | 12/2003 | Srinivasa | 382/104 |
| 2005/0111697 A1 | * | 5/2005 | Yamamoto et al. | 382/103 |
| 2006/0115113 A1 | * | 6/2006 | Lages et al. | 382/103 |
| 2006/0165276 A1 | * | 7/2006 | Hong et al. | 382/153 |
| 2006/0167588 A1 | * | 7/2006 | Kong et al. | 700/245 |
| 2006/0177101 A1 | * | 8/2006 | Kato et al. | 382/106 |
| 2006/0258938 A1 | * | 11/2006 | Hoffman et al. | 600/424 |
| 2006/0276964 A1 | * | 12/2006 | Sano | 701/300 |
| 2007/0085690 A1 | * | 4/2007 | Tran | 340/573.1 |
| 2010/0222925 A1 | * | 9/2010 | Anezaki | 700/253 |

FOREIGN PATENT DOCUMENTS

| | | |
|---|---|---|
| JP | 2006-033188 | 2/2006 |
| JP | 2006-127157 | 5/2006 |

* cited by examiner

*Primary Examiner* — Jason M Repko
*Assistant Examiner* — Shervin Nakhjavan
(74) *Attorney, Agent, or Firm* — Nixon & Vanderhye, P.C.

(57) ABSTRACT

According to an embodiment of the present invention, a tracking method includes detecting a mobile unit within a space, tracking the detected mobile unit, making a position determination of the mobile unit to be tracked to obtain positional data, and making a movement prediction of the mobile unit, based on a high frequency component of positional data.

18 Claims, 11 Drawing Sheets

TRACKING METHOD AND TRACKING APPARATUS

CROSS REFERENCE TO RELATED APPLICATION

This application is based upon and claims the benefit of priority from the prior Japanese Patent Application No. 2007-29424, filed on Feb. 8, 2007, the entire contents of which are incorporated herein by reference.

BACKGROUND OF THE INVENTION

1. Field of the Invention

The present invention relates to a tracking method and a tracking apparatus.

2. Background Art

In recent years, the introduction of an autonomous mobile unit such as a robot into the general environment such as a shop or facility has been examined. When a robot is introduced into the general environment, it is a problem whether the safety of the robot is assured. Particularly, under the environment where the robot and a person are coexistent, it is required that the robot recognizes the person and takes a safe operation for the person. On the other hand, it is important to assure the basic performance of the robot such as a smooth movement operation. Accordingly, when the robot is introduced into the general environment, a tradeoff between the assured safety and the assured basic performance is a problem.

Conventionally, when the robot recognizes a person, the robot stops at the site and waits for the person to leave away, or avoids the person while keeping an enough interval from the person. However, at the small shop or small scale facility, it is difficult to secure the interval between the robot and the person sufficiently. Accordingly, the robot has to stop at the site and let the person go away in such a case. However, the robot taking such a motion strategy has a bad work efficiency and is unusable for practical applications.

One of the reasons why such motion strategy must be taken is that the robot has less movement information of other mobile units. Accordingly, to realize the introduction of the robot into the general environment, it is important to improve techniques, such as detection technique for a mobile unit, tracking technique for a mobile unit, feature analysis technique for a mobile unit, and interaction technique between robots.

As examples of a system for detecting a mobile unit within a space, there are proposed a system using a surveillance camera and a system using a transmitter such as an ID tag. Furthermore, processes using these systems have been researched. Examples of such processes include person detection, position estimation, traffic line detection for a moving person, and action estimation for a moving person. Also, as an example of a method for detecting a mobile unit, there is proposed a method using optical flow. This method is effective for detecting the motion of a rigid single body such as one automobile or one ball, but this method easily causes a false detection for an object of multi-link structure such as a person, because it is difficult to treat its internal motion and interaction with other persons. JP-A 2006-127157 (KOKAI) describes a method for extracting the features of a mobile unit by time averaging of flow vectors. However, with this method, there is possibility that the features to be extracted may disappear by time average.

It is also researched that a point extracted from a camera image is translated from a camera screen onto a movement plane to estimate the movement amount of an object on the movement plane. JP-A 2006-33188 (KOKAI) describes a method for tracking an object by estimating the movement amount of the object on the movement plane using a speed vector. However, with this method, there is strong possibility that a meaningless motion contained in the significant motion of the person may be also detected. Also, if the speed vector is simply averaged over time to prevent this as previously described, there is strong possibility that the significant motion may also disappear.

Main purposes of the methods described in JP-A 2006-127157 (KOKAI) and JP-A 2006-33188 (KOKAI) are to investigate guest trend and to take crime prevention. With the method described in JP-A 2006-127157 (KOKAI) or JP-A 2006-33188 (KOKAI), information such as the position coordinate, moving speed, and residence time of a detected mobile unit is acquired. However, these kinds of information are not enough to support the motion of the autonomous mobile unit that autonomously moves within the shop or facility. Also, if only a client refers to these kinds of information exclusively, there is possibility that the movement of the autonomous mobile unit becomes movement based on the absolute viewpoint of the client.

SUMMARY OF THE INVENTION

An embodiment of the invention is, for example, a tracking method including, detecting a mobile unit within a space, tracking the detected mobile unit, making a position determination of the mobile unit to be tracked to obtain positional data, and making a movement prediction of the mobile unit, based on a high frequency component of positional data.

Another embodiment of the invention is, for example, a tracking apparatus including, a detection unit configured to detect a mobile unit within a space, a tracking unit configured to track the detected mobile unit, a determination unit configured to make a position determination of the mobile unit to be tracked, and a prediction unit configured to make a movement prediction of the mobile unit, based on a high frequency component of positional data obtained by the position determination.

DESCRIPTION OF THE EMBODIMENTS

Figure 1:
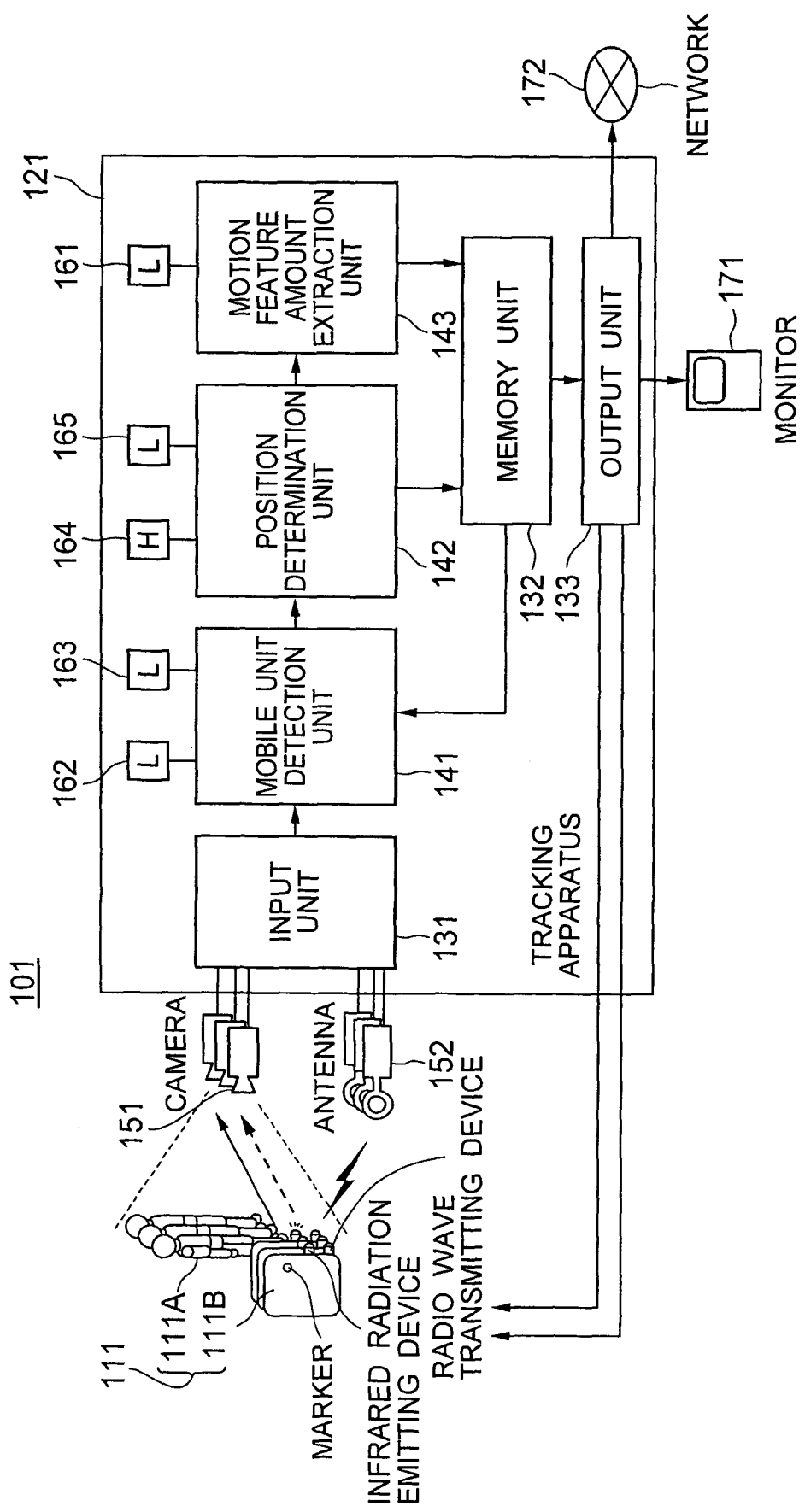
FIG. 1 is a system configuration diagram of a tracking system.

FIG. 1 is a system configuration diagram of a tracking system 101. The tracking system 101 is constructed in a space where various mobile units 111 such as a person 111A and a robot (autonomous mobile unit) 111B come and go. Here, the space is supposed to be a shop floor having a flat floor face where a person, shopping cart, and robot come and go.

The tracking system 101 of FIG. 1 includes a tracking apparatus 121, which detects a mobile unit 111 within the space and tracks the mobile unit 111. The tracking apparatus 121 includes an input unit 131, a memory unit 132, an output unit 133, a mobile unit detection unit 141, a position determination using a signal, and movement prediction using a position determination result.

(1) Position Determination Using Image

The tracking apparatus 121 is supplied with camera image information. Here, the image information which is divided in pixel units is inputted into the tracking apparatus 121 at a certain periodical interval. As the image information, the tracking apparatus 121 is supplied with an image within an angle of view of a camera. The image may be a still image or a moving image. Here, the image obtained by imaging a mobile unit 111 within the space is inputted into the tracking apparatus 121. The tracking apparatus 121 detects the mobile unit 111 from the image, and tracks the mobile unit 111 while the mobile unit 111 exists within a detectable area (angle of visibility of the camera). The mobile unit detection using the image has an advantage that various kinds of information such as shape, pattern, and color of the mobile unit 111 can be acquired, compared with mobile unit detections by other methods.

Figure 2:
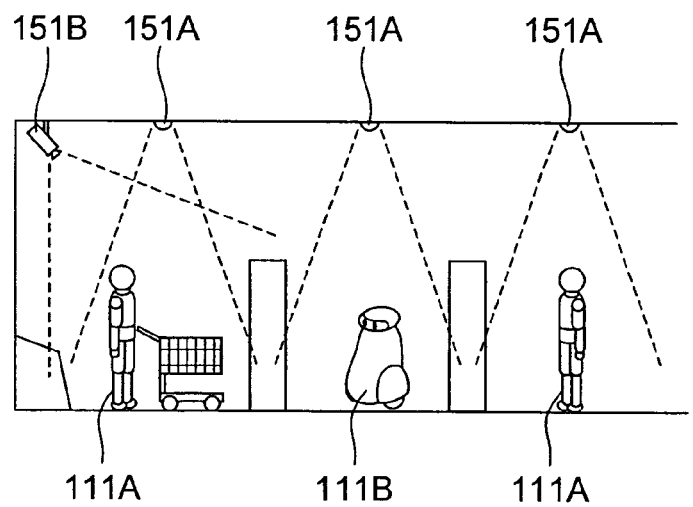
FIG. 2 is a view for explaining an installation situation of cameras.

In this embodiment, one or more wide-angle cameras 151 are mounted on the ceiling within the shop, as shown in FIG. 2. Here, there are mounted a plurality of cameras 151A having the optical axes directed to the vertically downward direction, and one or more cameras 151B having the optical axes inclined from the vertically downward direction. The cameras 151A are arranged so that the overlap of the fields of view is as little as possible. Each of the cameras 151B is arranged so that the inclination θ from the vertically downward direction is 0°<θ<90°.

The tracking apparatus 121 includes a user interface for allowing a user to input the mounted position, height, and direction of each camera 151 within the shop, as known information, into the tracking apparatus 121. Examples of the user interface include a keyboard, a mouse, and a monitor. The known information is saved in a storage of the tracking apparatus 121. Examples of the storage include a hard disk and a flash memory. Examples of the known information settable by the user include the mounted coordinate and posture of each camera 151, the correction value for distortion and the breadth for angle of view in the lenses of each camera 151, and shop structure information such as position, height, and size of each wall and pillar within the shop.

A specific example of the user who inputs the known information into the tracking apparatus 121 is a system administrator of the tracking system 101. The tracking apparatus 121 can recognize the structure of the shop where the tracking apparatus 121 is installed, according to the shop structure information inputted and saved. Further, the tracking apparatus 121 can grasp by which camera 151 each image is taken and in which part each image is taken within the shop, according to mounting data and lens data of each camera 151.

After mounting a camera 151, the tracking apparatus 121 can acquire a basic background image which is a reference image for difference process. Here, the basic background image is taken in a state where there is no coming and going of mobile units 111 such as person 111A and robot 111B, after the lighting situation of illumination and the exhibition situation of commodities within the shop is placed in the state during business hours. The taken basic background image is recorded as the reference image for the difference process.

Figure 3:
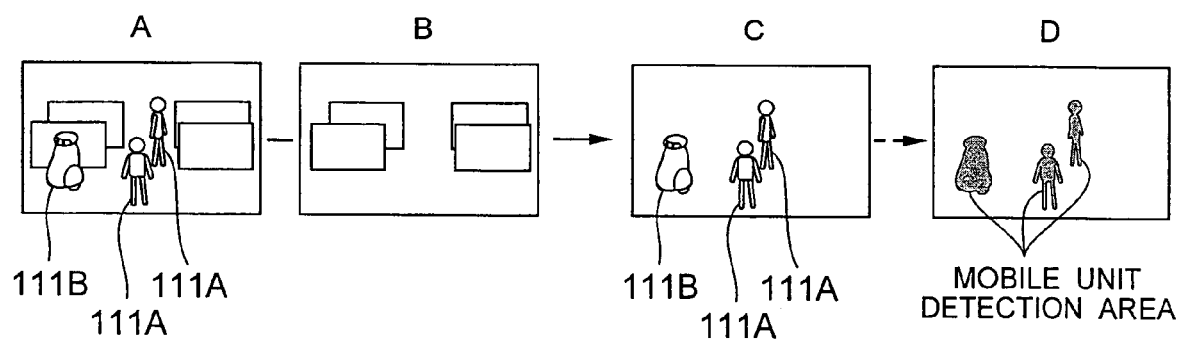
FIG. 3 is a view for explaining a process for detecting a mobile unit.

During normal business hours of the shop, an image shot by the camera 151 is inputted at a certain periodical interval into the tracking apparatus 121. The tracking apparatus 121 loads the basic background image corresponding to the inputted image, and performs a difference process (correlation comparison) between the image and the basic background image. FIGS. 3A and 3B show specific examples of the image and the basic background image. Through the difference process, mobile units 111 such as person 111A and robot 111B are detected from the image, as shown in FIG. 3C. The tracking apparatus 121 detects an area where the correlation value between the image and the basic background image is less than or equal to a threshold (unmatched area), as an image unit 142, and a motion feature amount extraction unit 143. The mobile unit detection unit 141 is a block for detecting a mobile unit 111 within the space and tracking the mobile unit 111. The mobile unit detection unit 141 is an example of a detection unit and tracking unit. The position determination unit 142 is a block for making a position determination of the mobile unit 111. The position determination unit 142 is an example of a determination unit and prediction unit. The motion feature amount extraction unit 143 is a block for extracting a motion feature amount of the mobile unit 111. The motion feature amount extraction unit 143 is an example of an extraction unit, filtering unit, and distinction unit.

Information for detecting a mobile unit 111 within the space is inputted into the input unit 131. The mobile unit detection unit 141 detects and tracks the mobile unit 111 using this information. The position determination unit 142 determines the position of the mobile unit 111. The motion feature amount extraction unit 143 extracts a motion feature amount of the mobile unit 111. A determination result of the position and an extraction result of the motion feature amount are stored in the memory unit 132, and used at the next mobile unit detection. The output unit 133 outputs, for example, a prediction result of a movement prediction for the mobile unit 111.

The tracking system 101 of FIG. 1 is provided with one or more cameras 151 for imaging a mobile unit 111 within the space, and one or more antennas 152 for receiving a signal transmitted from a mobile unit 111 within the space. The tracking apparatus 121 can acquire an image taken by each camera 151, and a signal received at each antenna 152, via the input unit 131. Each of the cameras 151 and antennas 152 may be equipped in the tracking apparatus 121 or installed within the shop.

In the following description, a tracking method performed by the tracking apparatus 121 will be described, in the order of position determination using an image, position determination area where a mobile unit 111 exists (mobile unit detection area), as shown in FIG. 3D.

Figure 4:
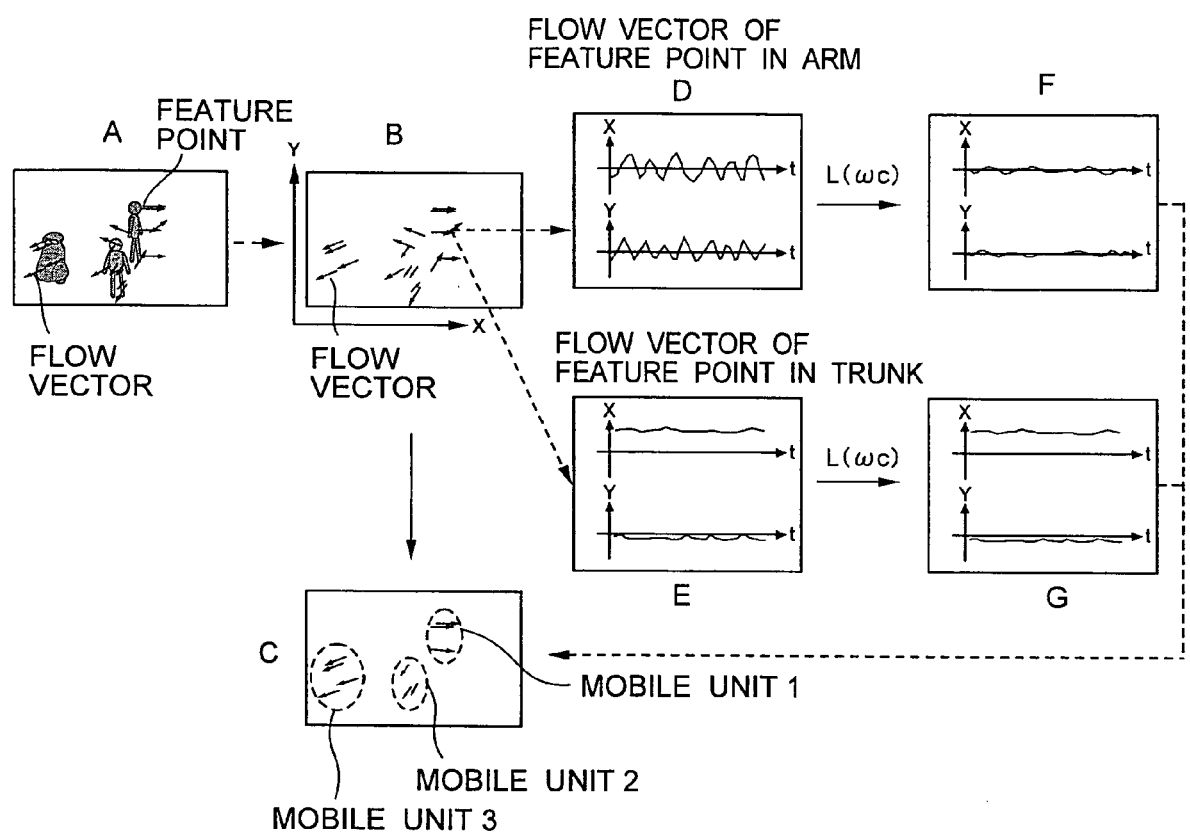
FIG. 4 is a view for explaining a process for extracting motion feature amount.

The tracking apparatus 121 provides, regarding a mobile unit 111 detected through the difference process, a feature point on the geometrical pattern of the texture, as shown in FIG. 4A. Further, the tracking apparatus 121 extracts a motion feature amount which is a feature amount regarding the motion of the mobile unit 111. Examples of the motion feature amount include speed and acceleration. Here, the tracking apparatus 121 observes and extracts, as the motion feature amount of the mobile unit 111, the motion of the feature point on a time continuous image, i.e., an optical flow of the mobile unit 111, as shown in FIG. 4B.

Moreover, the tracking apparatus 121 distinguishes each mobile unit 111, based on the angle of the flow vector of the optical flow, as shown in FIG. 4C. Regarding one feature point and another feature point that are proximate, if the angle between the flow vector of the former feature point and the flow vector of the latter feature point is within a certain threshold, the former feature point and the latter feature point are judged to belong to the same mobile unit 111. Conversely, if the angle is not within the threshold, the former feature point and the latter feature point are judged to belong to different mobile units 111. In this manner, different mobile units 111 in the same image are distinguished. If the feature points belonging to the same mobile unit detection area are judged to belong to different mobile units 111, the mobile unit detection area is divided for each mobile unit 111, and each mobile unit detection area produced by division is managed by its own identification name. Mobile unit detection areas produced by the division are managed by respective identification names.

Particularly, in this embodiment, the tracking apparatus 121 filters the flow vector of the optical flow through a frequency filter 161 (FIG. 1). Each of FIGS. 4D and 4E shows time variations of X component and Y component of a flow vector before filtering. Here, the X direction and the Y direction correspond to the transverse direction and the longitudinal direction of image. The flow vector of FIG. 4D corresponds to a flow vector of a feature point in person's arm, and the flow vector of FIG. 4E corresponds to a flow vector of a feature point in person's trunk.

The frequency filter 161 is here a low pass filter having a cut-off frequency $\omega_c$. The cut-off frequency $\omega_c$ is greater than the frequency component of the center of gravity, $\omega_1$, conceivably contained in the normal movement of a person within the shop, and smaller than the vibration frequency component, $\omega_2$, conceivably contained in the pitch motion of arm swing and leg movement when a person walks and moves. That is, $\omega_1 < \omega_c < \omega_2$. In this manner, the frequency filter 161 is a low pass filter in consideration of operation frequencies of person.

An example of the value of $\omega_1$ is the frequency from 0.1 Hz to 1.0 Hz. An example of the value of $\omega_2$ is the frequency from 2.0 Hz to 5.0 Hz. Accordingly, an example of the value of $\omega_c$ is the frequency from 0.1 Hz to 5.0 Hz, preferably from 1.0 Hz to 2.0 Hz. The filtering action of the low pass filter 161 is represented by the expression (1). $F_{in}$ denotes the flow vector before filtering, $F_{out}$ denotes the flow vector after filtering, and $L(\omega_c)$ denotes the low pass filter 161.

$$F_{out} = L(\omega_c) F_{in} \quad (1)$$

Each of FIGS. 4F and 4G shows time variations of X component and Y component of the flow vector after filtering. It can be found that the high frequency component of the flow vector is removed by the frequency filter 161. In this embodiment, the tracking apparatus 121 distinguishes each mobile unit 111, based on the optical flow filtered through the frequency filter 161. That is, in this embodiment, parts of the same mobile unit 111 are recognized as the same mobile unit 111, and parts of different mobile units 111 are recognized as different mobile units 111, based on optical flows filtered through the frequency filter 161. Thereby, in this embodiment, it is suppressed that the trunk (low frequency component) and the hand and foot (high frequency component) of one person are falsely recognized as different mobile units 111, and a plurality of mobile units 111 can be distinguished. The former effect is mainly caused by removal of higher frequency component than the cut-off frequency, and the latter effect is caused by remnant of lower frequency component than the cut-off frequency. As described above, a method for distinguishing each mobile unit 111 is performed based on the angle of the flow vector of the optical flow.

Here, the distinction between each mobile unit 111 is not necessarily perfect. In practice, the mobile unit 111 recognized as one mobile unit may correspond to one person, or a group of plural persons, as will be described later. To discriminate between the former case and the latter case, a matching process is performed.

Also, in this embodiment, the image taken by the camera 151 is filtered through a frequency filter. The tracking apparatus 121 filters the image through a low pass filter 162 (FIG. 1) having a cut-off frequency $\omega_c$ lower than the frequency $\omega_1$. Then, the tracking apparatus 121 updates the basic background image by combining the image filtered through the low pass filter 162 and the basic background image. Thereby, a background removal process (FIG. 3) for a strong background variation such as a varying commodity exhibition situation is implemented.

In this embodiment, the basic background image and the image are combined at a predetermined weighting. Specifically, each pixel value component of the basic background image and each pixel value component of the image are added at a ratio of 1-W to W, as in the expression (2). $G_{now}$ denotes the current image, $G_{old}$ denotes the basic background image before update in current use, $G_{new}$ denotes the basic background image after update for use at the next period, and $L(\omega_c)$ denotes the low pass filter 162. For W (weight factor for time weighting), 0<W<1 holds, and for $\omega_c$ (cut-off frequency), $\omega_c < \omega_1$ holds. In this manner, the tracking apparatus 121 repeatedly updates the basic background image.

$$G_{new} = (1-W) \cdot G_{old} + W \cdot L(\omega_c) G_{now} \quad (2)$$

Figure 5:
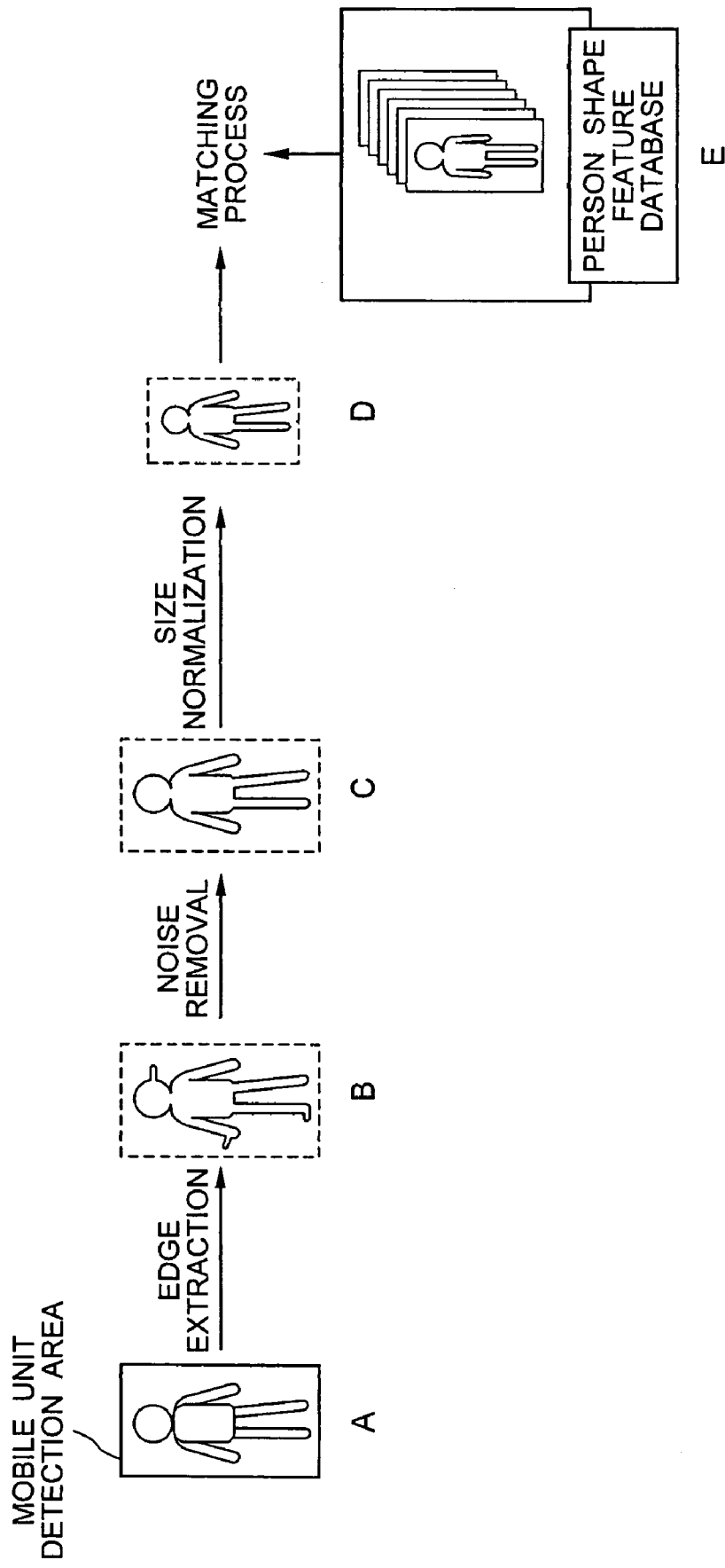
FIG. 5 is a view for explaining an image process for a mobile unit detection area.

Also, the tracking apparatus 121 performs image processing such as binarization and edge extraction (contour extraction), for an image area where a mobile unit is detected (mobile unit detection area, FIG. 3D). FIG. 5A shows an image area before image processing, and FIG. 5B shows an image area after image processing.

Next, the tracking apparatus 121 performs filtering through a frequency filter for the image area, prior to a collation process (matching process) of the image area with a sample image for the collation process. The tracking apparatus 121 filters the image area through a low pass filter 163 (FIG. 1) whose cut-off frequency is the maximum frequency component for the contour line of a person in the sample image. Thereby, noise removal is performed from the image area where the edge extraction is made, as shown in FIG. 5C. Further, the tracking apparatus 121 normalizes the size of the image area, as shown in FIG. 5D. Thereby, the size of the image area is scaled up or down to the same size as the sample image.

Then, the tracking apparatus 121 performs the matching process of the image area with the sample image. As the sample image, a template having the contour line representing the shape feature of a person (person shape feature template) is used. Accordingly, through the matching process of the image area with the sample image, the tracking apparatus 121 can judge whether or not the mobile unit 111 in the image area is one person.

For the tracking apparatus 121, a number of sample images are prepared as a person shape feature database (FIG. 5E). The tracking apparatus 121 performs the matching process (correlation comparison) of each image area with at least one kind of sample image. If the correlation value with any sample image is greater than or equal to a threshold, the mobile unit 111 in the image area is recognized as one person.

Figure 6:
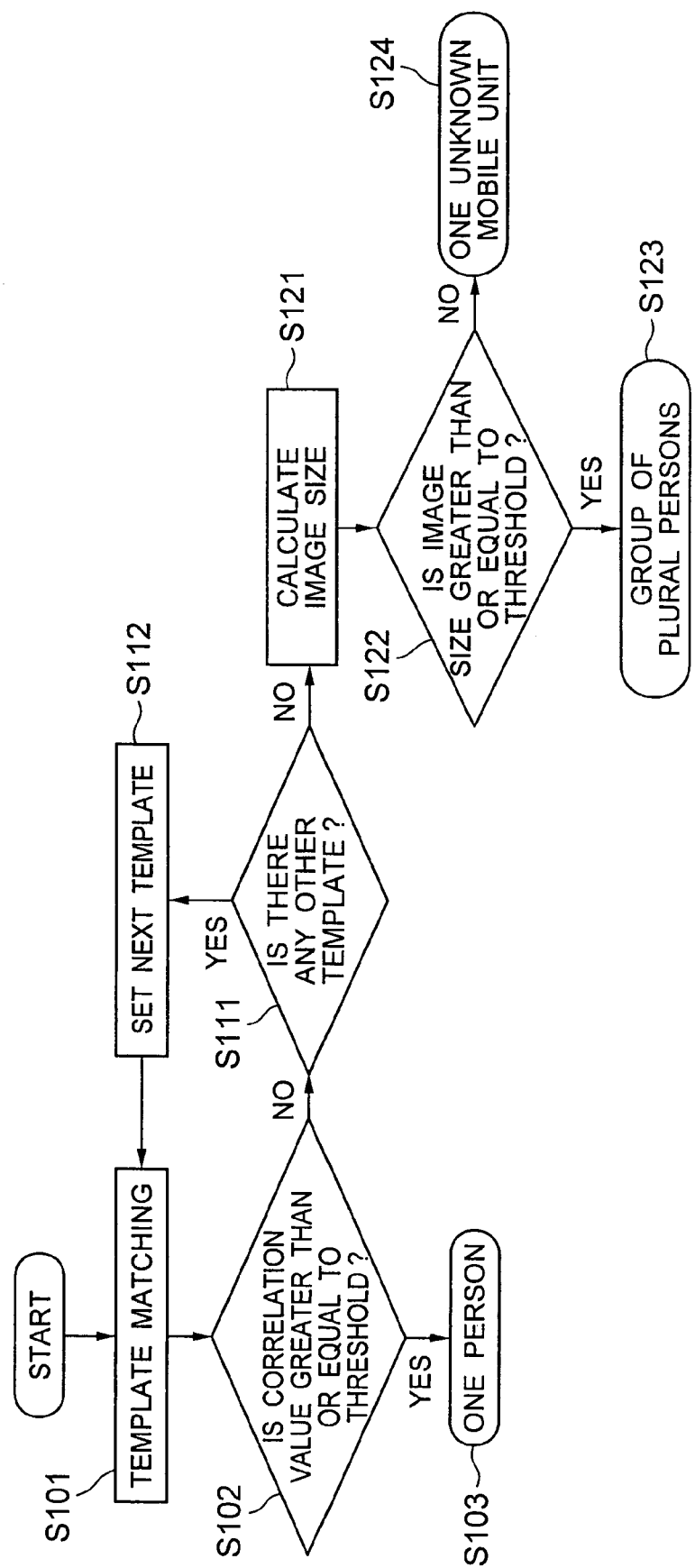
FIG. 6 is a flowchart showing a matching process.

FIG. 6 shows a processing flow of this matching process. The tracking apparatus 121 performs a matching process of an image area with a sample image (template) (S101). If the correlation value between the image area and the sample image is greater than or equal to a threshold (S102), the mobile unit 111 in the image area is judged as one person (S103).

The matching process at S101 is repeated until the sample images (templates) to be used are exhausted (S111, S112). If the correlation value with any sample image is greater than or equal to the threshold (S102), the mobile unit 111 in the image area is judged as one person (S103). On the other hand, if the correlation values with all the sample images are less than the threshold, the mobile unit 111 in the image area is not judged as one person, and the procedure goes to S121. The process from S121 will be described later.

If the mobile unit 111 in the image area is judged as one person through the matching process, the tracking apparatus 121 gives an inherent ID (identification) to the mobile unit 111. The tracking apparatus 121 further acquires a character feature amount which is a feature amount characterizing the character (mobile unit 111). Examples of the character feature amount include color features, such as absolute color information for each part of the character, and relative color relation between each part of the character and its vicinity. Also, examples of the character feature amount include geometrical features, such as the image size of the image having the character, and the coordinates of the image in the entire image. Also, examples of the character feature amount include texture features, such as coordinates of each feature point in the image having the character. The character feature amounts such as the color features, geometrical features, and texture features exemplified herein can be acquired from the image or image area, through image processing or analysis process by the tracking apparatus 121.

Then, the tracking apparatus 121 manages the character feature amount acquired for the mobile unit 111, associated with the mobile unit 111. Specifically, the character feature amount of the mobile unit 111 is stored and managed associated with the ID of the mobile unit 111. The character feature amount is used as identification information for tracking the mobile unit 111. That is, the tracking apparatus 121 judges that a newly detected mobile unit and a stored mobile unit are identical, if the correlation value between the character feature amount of the detected mobile unit and the stored character feature amount is greater than a certain threshold. The detected mobile unit is given the same ID as the stored mobile unit. In this embodiment, the same mobile unit can be tracked due to this mobile unit identification. Thereafter, the character feature amount is updated by a weight function and a time dependent forgetfulness factor.

On the other hand, if the mobile unit 111 in the image area is not judged as one person in the matching process, the tracking apparatus 121 calculates the image size of the image area, regarding the image area before normalization of FIG. 5D (S121 of FIG. 6). Then, the tracking apparatus 121 judges whether or not the image size is greater than or equal to a threshold (S122). Thereby, the tracking apparatus 121 can judge whether or not the mobile unit 111 in the image area is a group of plural persons.

If the image size is greater than or equal to the threshold, the tracking apparatus 121 judges the mobile unit 111 as a group of plural persons (S123), or if the image size is less than the threshold, the tracking apparatus 121 judges the mobile unit 111 as one unknown mobile unit (S124). The threshold is set to the image size corresponding to the size of one standard person. It is noted that the image size changes depending on mounted situation of the camera, detection position of the image area within the camera screen, and the like.

For example, in a tilted camera such as a camera 151B of FIG. 2, the mobile unit at the lower side of the camera screen is located closer to the camera and reflected larger on the screen, and the mobile unit at the upper side of the camera screen is farther away to the camera and reflected smaller on the screen. Accordingly, in this case, the threshold is set smaller according to the height of the grasped mobile unit. The changing ratio of the threshold can be set based on the perspective property of the image.

Similarly, in a vertically downward faced camera such as a camera 151A of FIG. 2, the mobile unit near the center of the camera screen is located closer to the camera and reflected larger on the screen, and the mobile unit near the periphery of the camera screen is located farther away to the camera and reflected smaller on the screen. Accordingly, in this case, the threshold is set smaller according to the distance of the grasped mobile unit from the center of the screen. The changing ratio of the threshold can be set based on the perspective property of the image, in the same manner as above.

If the mobile unit 111 is judged as a group of plural persons, the tracking apparatus 121 calculates the ratio of the image size calculated at S121 and the threshold used at S122, as a congestion degree indicating the degree that the group is congested. The congestion degree is stored and managed as a state quantity at the specific time (detection time of the image area) and the specific place (detection position of the image area). The congestion degree is usable as a character feature amount (group feature amount in this case) of the mobile unit 111, for example.

Also, the tracking apparatus 121 determines the position of the mobile unit 111, using the image area where the mobile unit 111 is detected (mobile unit detection area, FIG. 3D). When the tracking apparatus 121 determines the position of the mobile unit 111 which is judged as one person, it decides one representative point within the mobile unit detection area of the mobile unit 111, and determines the representative point as the current position of the mobile unit 111.

Figure 7:
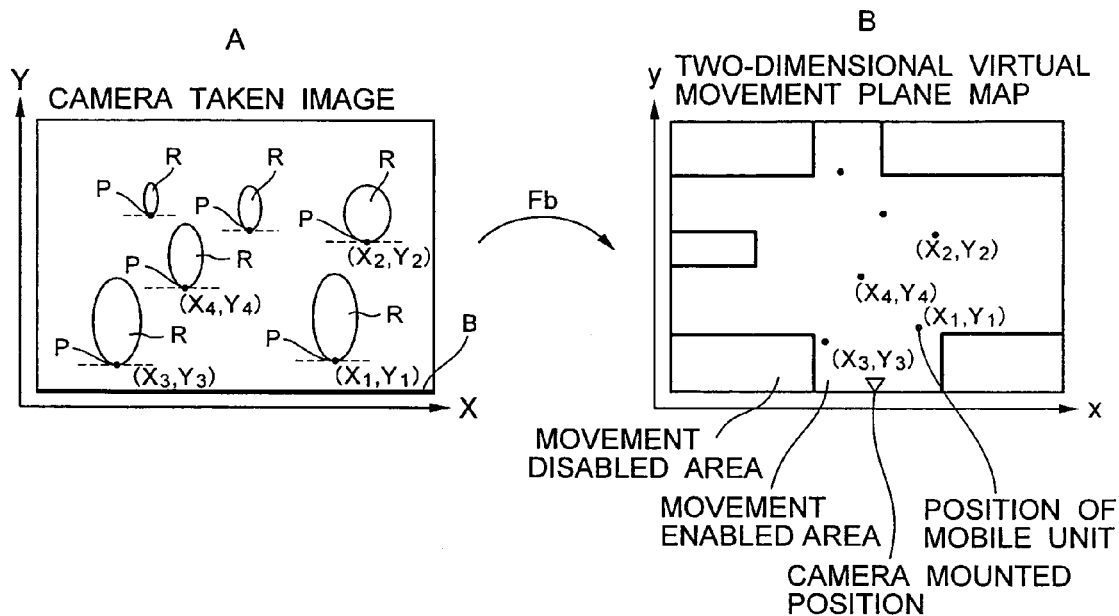
FIG. 7 is a view for explaining the position determination for a mobile unit.

FIG. 7A shows an example of an image taken by the camera 151B (obliquely looking down camera) of FIG. 2. The lower end of the image is shown by "B". In an image area within the image, a point nearest to the lower end B within the image area is decided as a representative point of the image area. The representative point P of each image area R is shown in FIG. 7A.

Figure 8:
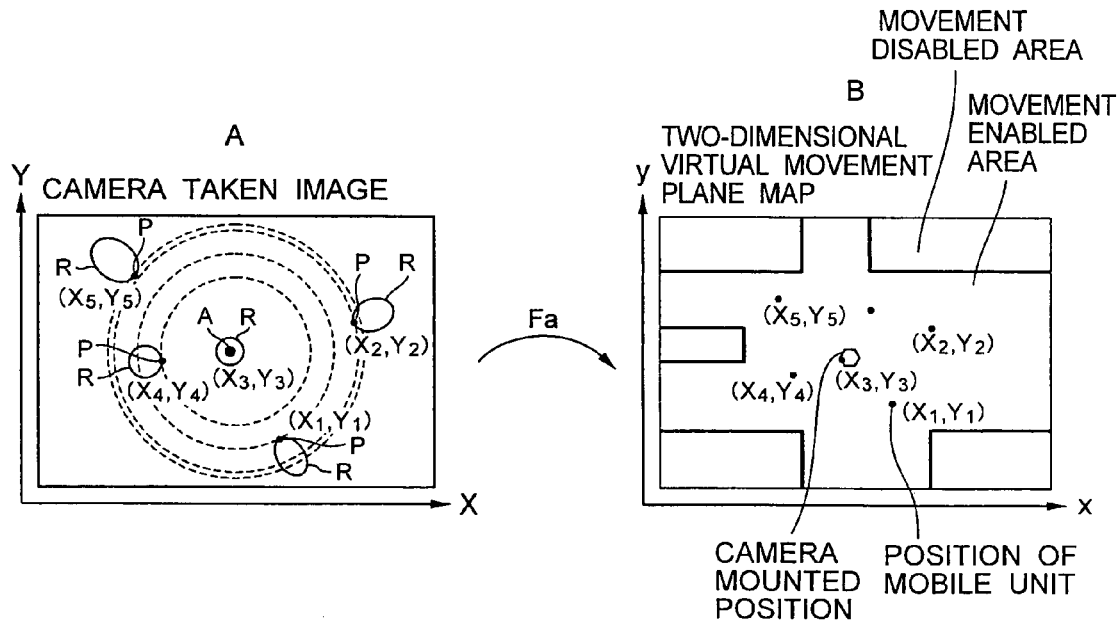
FIG. 8 is a view for explaining the position determination for a mobile unit.

FIG. 8A shows an example of an image taken by the camera 151A (vertically looking down camera) of FIG. 2. The center of the image is shown by "A". In an image area within the image, a point nearest to the center A within the image area is decided as a representative point of the image area. The representative point P of each image area R is shown in FIG. 8A.

With the methods of FIGS. 7A and 8A, the point corresponding to the foot of the mobile unit 111 is decided as the representative point of the image area. This is because, in the image of FIG. 7A, the foot of each mobile unit 111 is closer to the lower end B of the image, and in the image of FIG. 8A, the foot of each mobile unit 111 is closer to the center A of the image. In this embodiment, since a danger of approach or collision between mobile units 111 is a problem, it may be appropriate to represent the position of each mobile unit 111 with the position of the foot of each mobile unit 111.

If there are a plurality of points nearest to the lower end B or the center A of the image within one image area, the point nearest to the center of gravity of the image area among those points is decided as the representative point. Instead of making the point nearest to the center of gravity of the image area the representative point, the point nearest to the center line of the image area may be decided as the representative point.

Also, regarding the method of FIG. 8A, it is desirable to correct an image distortion of the wide-angle lens, before the position determination. Also, regarding the method of FIG. 8A, for an image area overlapping with the center A of the image, or for an image area near the center A of the image, the center of gravity of the image area may be decided as the representative point of the image area.

The tracking apparatus 121 creates a two-dimensional virtual movement plane map, based on a determination result of the position of each mobile unit 111, and in consideration of the mounted position, posture, and lens characteristics of the camera, as shown in FIG. 7B or 8B. That is, the coordinate transformation ($F_b$) from the screen of FIG. 7A to the map of FIG. 7B, or the coordinate transformation ($F_a$) from the screen of FIG. 8A to the map of FIG. 8B, is performed by the tracking apparatus 121.

The tracking apparatus 121 stores and manages the position and congestion degree of each mobile unit 111, as state quantities at the specific time (detection time of the image area) and the specific place (detection position of the image area), in time series.

In this embodiment, each robot and shopping cart may be provided with an illuminant or a marker. In this case, a flash signal of the illuminant, or the color, pattern, or geometrical design of the marker is grasped by the camera. Thereby, the mobile unit-detection process is facilitated.

Though the position determination using an image has been described in this chapter, the position determination using a signal will be described in the next chapter.

(2) Position Determination Using Signal

The tracking system 101 of FIG. 1 is provided with a receiver for receiving a radio wave signal transmitted from a transmitter of each mobile unit 111. The tracking apparatus 121 can analyze a signal code of the radio wave signal, and can measure the strength of the radio wave signal. The tracking system 101 is provided with one or more antennas 152 for receiving the radio wave signal, as shown in FIG. 1. The tracking apparatus 121 allows a user to input the mounted position of each antenna 152 as known information, as in the case of the cameras 151. The tracking apparatus 121 detects a mobile unit 111 within the space, using the radio wave signal transmitted from the mobile unit 111. The tracking apparatus 121 tracks the mobile unit 111, while the mobile unit 111 exists within a detectable area (area capable of receiving the radio wave signal). The mobile unit detection using the signal has an advantage that identifiable information of the mobile unit 111 can be contained in the signal, compared with mobile unit detections by other methods. An example of this information is an ID code as will be described later.

In this embodiment, each robot and shopping cart among the mobile units 111 within the shop is provided with a transmitter. Also, in this embodiment, each mobile unit 111 is allocated an ID code (mobile unit identification code) which is different for each mobile unit 111. The ID code of a mobile unit 111 is appended to the radio wave signal transmitted from the mobile unit 111. The ID code is used as identification information for tracking the mobile unit 111. The tracking apparatus 121 tracks the mobile unit 111 by associating the mobile unit 111 with the radio wave signal, based on the ID code.

The tracking apparatus 121 creates a two-dimensional virtual movement plane map, based on the strength of the received radio wave signal, as shown in FIG. 7B or 8B. Specifically, the tracking apparatus 121 firstly draws a circle having a radius of the strength of the received radio wave signal, and centered at the position of an antenna 152 receiving the radio wave signal. Then, the tracking apparatus 121 draws a straight line from the center to the direction of receiving the radio wave signal, and determines an intersection point between the circle and the straight line as the position of the mobile unit 111. The tracking apparatus 121 creates the two-dimensional virtual movement plane map, using such position determination result.

The relationship between the signal strength and the distance can be experimentally decided beforehand. Also, the relationship between the signal strength and the distance for each antenna 152 may be experimentally measured in detail beforehand, which allows the tracking apparatus 121 to correct a distortion from the ideal concentric circular strength distribution.

Though the position determination using an image has been described in the previous chapter and the position determination using a signal has been described in this chapter, the tracking apparatus 121 of this embodiment may use these position determination methods together.

(3) Movement Prediction Using Position Determination Result

The tracking apparatus 121 of FIG. 1 can acquire positional data of each mobile unit 111 to be tracked, by the position determination for each mobile unit 111. With the position determination as described in the first chapter (position determination using an image), the coordinate data of the representative point of each mobile unit 111 is obtained as the positional data of each mobile unit 111. With the position determination as described in the second chapter (position determination using a signal), the coordinate data of the position where the signal is transmitted from each mobile unit 111 is obtained as the positional data of each mobile unit 111. In this embodiment, the tracking apparatus 121 of FIG. 1 makes a movement prediction of each mobile unit 111, based on the positional data obtained by any of these position determinations. Here, the movement prediction is made based on a high frequency component and low frequency component of the positional data.

In making the movement prediction for a mobile unit 111, the tracking apparatus 121 firstly acquires the time series data of the positional data of the mobile unit 111. Specifically, the time series data of the X coordinate and the Y coordinate of the mobile unit 111 is acquired. The axial directions of the X coordinate and the Y coordinate are identical with the axial directions of the X coordinate and the Y coordinate on the two-dimensional virtual movement plane map, respectively.

Next, the tracking apparatus 121 performs a filtering of the time series data through a high pass filter 164 (FIG. 1), and a filtering of the time series data through a low pass filter 165 (FIG. 1). Each of the high pass filter 164 and the low pass filter 165 is a frequency filter whose cut-off frequency $\omega_c$ is the maximum frequency component contained in the typical walking motion of a person (excluding noise component). That is, the cut-off frequency of the high pass filter 164 and the cut-off frequency of the low pass filter 165 are equal. Here, each of the high pass filter 164 and the low pass filter 165 is of a sequential or recursive computation type (first order lag type).

In this embodiment, the tracking apparatus 121 makes the movement prediction for each mobile unit 111, based on high pass time series data (high pass positional data) obtained by filtering the time series data (positional data) through the high pass filter 164, and low pass time series data (low pass positional data) obtained by filtering the time series data (positional data) through the low pass filter 165. The movement prediction may be performed based on the high pass time series data and the low pass time series data themselves, or based on data derived from the high pass time series data and the low pass time series data, as will be described later. The movement prediction will be described below in more detail.

Each of the high pass positional data and the low pass positional data is a two-dimensional vector including X component and Y component. The tracking apparatus 121 calculates a local moving speed vector $V_{micro}$ represented by the expression (3), and a global moving speed vector $V_{macro}$ represented by the expression (4), as movement feature amounts which are feature amounts regarding the movement of the mobile unit 111. Examples of a movement feature amount include speed and acceleration. In the expressions (3) and (4), P denotes the positional data of the mobile unit 111, $H(\omega_c)$ denotes the high pass filter 164, and $L(\omega_c)$ denotes the low pass filter 165.

$$V_{micro} = \frac{d}{dt}(H(\omega_c)P) \quad (3)$$

$$V_{macro} = \frac{d}{dt}(L(\omega_c)P) \quad (4)$$

The local moving speed vector $V_{micro}$ is a differential amount of the high pass positional data $H(\omega_c)P$. The local moving speed vector $V_{micro}$ is a movement feature amount indicating the microscopic movement feature of the mobile unit 111. On the other hand, the global moving speed vector $V_{macro}$ is a differential amount of the low pass positional data $L(\omega_c)P$. The global moving speed vector $V_{macro}$ is a movement feature amount indicating the macroscopic movement feature of the mobile unit 111. Since these speed vectors are time differential amounts of the positional data, the time series data of the positional data is required to calculate these speed vectors. The tracking apparatus 121 stores and manages the calculated global moving speed vector $V_{macro}$ and local moving speed vector $V_{micro}$ in time series, associated with the mobile unit 111, like the positional data.

Figure 9:
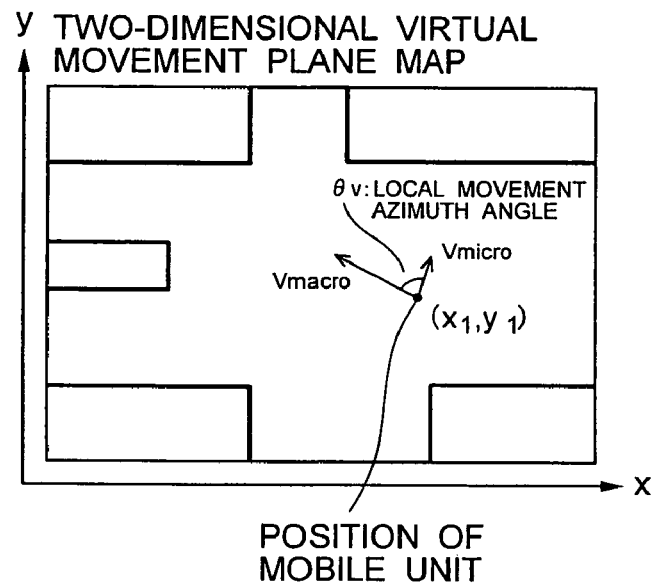
FIG. 9 is a view for explaining a local movement azimuth angle.

FIG. 9 shows an angle $\theta_v$ made by the local moving speed vector $V_{micro}$ relative to the global moving speed vector $V_{macro}$. The angle $\theta_v$ can be regarded as the moving direction caused by a microscopic motion that the mobile unit 111 performing a macroscopic motion conducts at a certain moment. The angle $\theta_v$ is referred to as a local movement azimuth angle. The tracking apparatus 121 calculates the angle $\theta_v$, and stores and manages the angle $\theta_v$ as a movement feature amount of the mobile unit 111 in time series, associated with the mobile unit 111. A calculation formula for the local movement azimuth angle $\theta_v$ is the following expression (5).

$$\theta_v = \cos^{-1}\left(\frac{V_{macro} \cdot V_{micro}}{|V_{macro}||V_{micro}|}\right) \quad (5)$$

The tracking apparatus 121 further calculates a value T that is the absolute value of the local moving speed vector $V_{micro}$ multiplied by a certain weight factor W. This T is referred to as an azimuth momentary movement amount in the direction of the relative azimuth angle θ from the global moving speed direction. A calculation formula for the azimuth momentary movement amount T is the following expression (6). The tracking apparatus 121 stores and manages the azimuth momentary movement amount T as a movement feature amount of the mobile unit 111 in time series, associated with the mobile unit 111.

$$T = W \cdot |V_{micro}| \quad (6)$$

Figure 10:
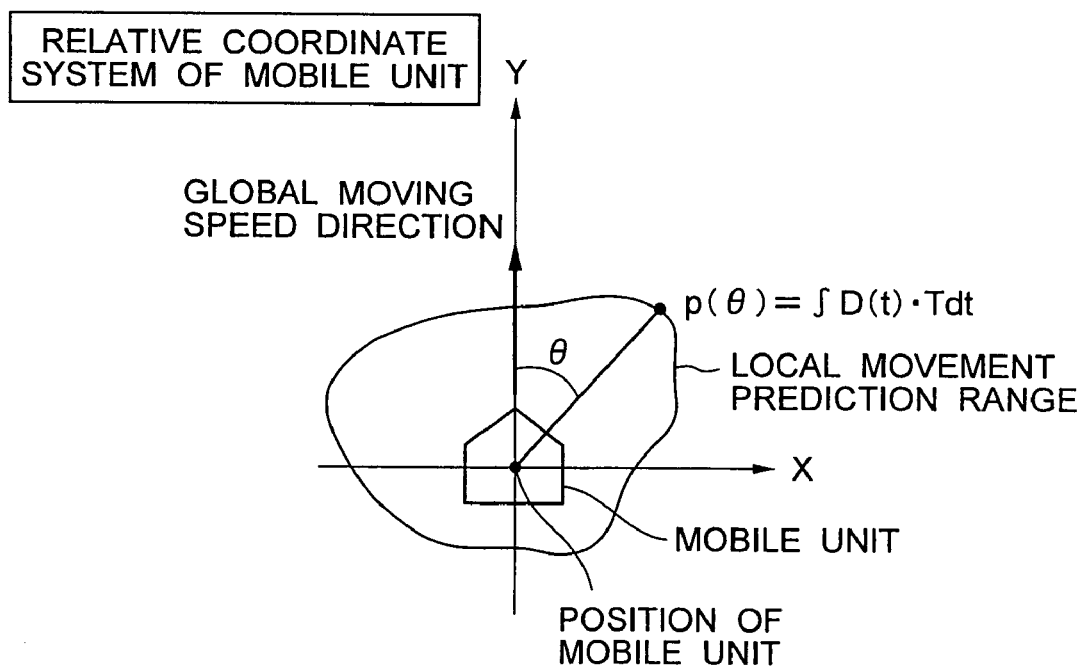
FIG. 10 is a view for explaining a local movement prediction range.

The tracking apparatus 121 further calculates a value P(θ) of integrating the product of the azimuth momentary movement amount T and the time dependent forgetfulness factor D(t) over time. This value P(θ) is referred to as a local movement prediction range in the direction of the relative azimuth angle θ from the global moving speed direction. A calculation formula for the local movement prediction range P(θ) is the following expression (7). The local movement prediction range P(θ) is shown in FIG. 10. The tracking apparatus 121 stores and manages the local movement prediction range P(θ) as a movement feature amount of the mobile unit 111, associated with the mobile unit 111.

$$P(\theta) = \int D(t) \cdot T dt \quad (7)$$

The tracking apparatus 121 further calculates a value U of integrating the local movement prediction range P(θ) all around the relative azimuth angle θ. This value U is referred to as a complex mobility. A calculation formula for the complex mobility U is the following expression (8). The tracking apparatus 121 stores and manages the complex mobility U as a movement feature amount of the mobile unit 111, associated with the mobile unit 111.

$$U = \int P(\theta) d\theta = \iint D(t) \cdot T dt d\theta \quad (8)$$

The complex mobility U indicates the possibility that the mobile unit 111 suddenly moves in another direction from a large flow of movement. If the complex mobility U is greater, the possibility that the mobile unit 111 suddenly moves in another direction is high, so that another mobile unit 111 that is located near the mobile unit 111 has a greater danger. Conversely, if the complex mobility U is smaller, the possibility that the mobile unit 111 suddenly moves in another direction is low, so that another mobile unit 111 that is located near the mobile unit 111 has a smaller danger. In this manner, the complex mobility U is a parameter indicating the height of possibility that the mobile unit 111 suddenly moves in another direction.

Accordingly, the tracking apparatus 121 obtains a prediction result of the movement prediction such as how much possibility there is that the mobile unit 111 suddenly moves in another direction, as a result of the complex mobility U being derived. That is, the tracking apparatus 121 makes the movement prediction in the form of predicting how much possibility there is that the mobile unit 111 suddenly moves in another direction, by deriving the complex mobility U. It is possible to know the height of possibility that the mobile unit 111 suddenly moves in another direction, from the complex mobility U (prediction data) obtained by the movement prediction. The complex mobility U is an example of the prediction data.

The tracking apparatus 121 uses the current positional data and a few pieces of the previous positional data (i.e., positional data in the past), as positional data for calculating the complex mobility U. Thereby, the tracking apparatus 121 predicts the next movement (i.e., movement in the future) of the mobile unit 111. The positional data in the past may be the positional data stored in time series in the memory unit 132

(FIG. 1). The number how many pieces of the positional data in the past are to be used may be arbitrary. In this embodiment, a few pieces of the positional data in the past are to be used. Accordingly, a high pass filter and a low pass filter of sequential or recursive computation type are employed as the high pass filter 164 and the low pass filter 165, in this embodiment.

The tracking apparatus 121 notifies the complex mobility U of each mobile unit 111 within the shop, to the robot 111B within the shop. Then, when the robot 111B passes near another mobile unit 111, the robot 111B refers to the complex mobility U of the mobile unit 111. Then, if the complex mobility U is great, the robot 111B takes a greater interval from the mobile unit 111 in passing near the mobile unit 111, to avoid a danger of collision with the mobile unit 111. Conversely, if the complex mobility U is small, the robot 111B does not need to take a greater interval from the mobile unit 111 in passing near the mobile unit 111, whereby the movement efficiency of the robot 111B is not impeded.

In this manner, since the prediction data obtained by the movement prediction is notified to the robot 111B in this embodiment, it is possible to avoid a danger of approach or collision between the robot 111B and another mobile unit 111, while keeping the movement efficiency of the robot 111B. An example of the notification method from the tracking apparatus 121 to the robot 111B is wireless communication via the output unit 133 (FIG. 1).

The tracking apparatus 121 may make the movement prediction in another way from the above movement prediction. Here, as an example of a movement feature amount instead of the complex mobility U, a movement prediction area $S(\theta)$ is adopted.

Figure 11:
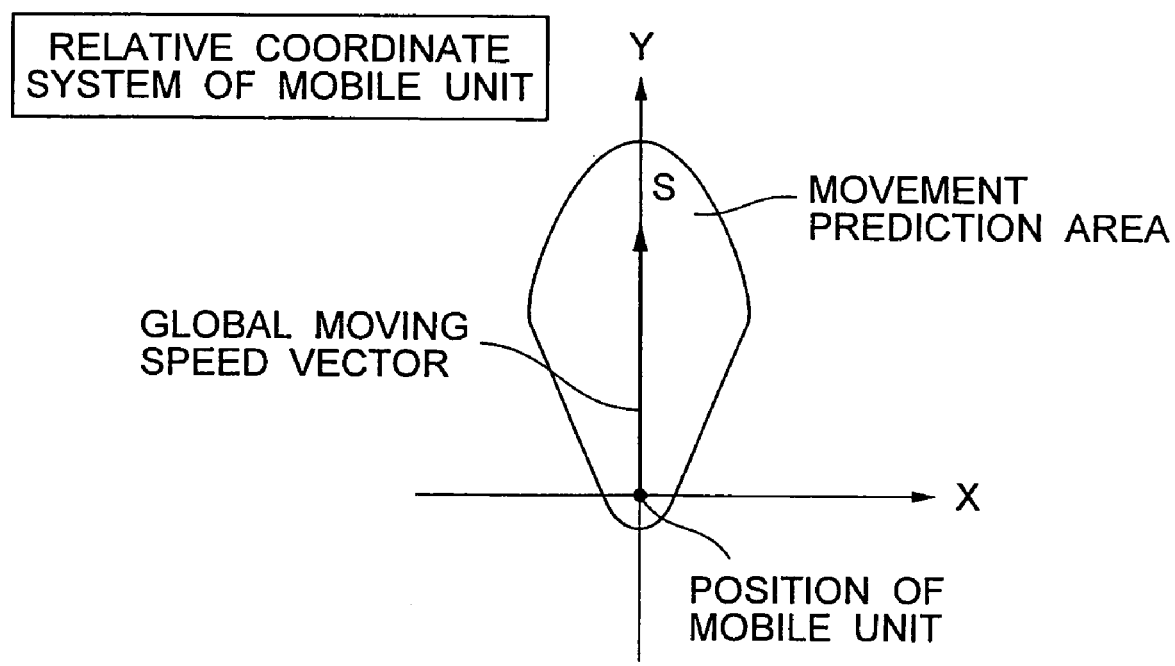
FIG. 11 is a view for explaining a movement prediction area.

As shown in FIG. 11, the movement prediction area $S(\theta)$ is provided to be largest in the global moving speed direction, and open to both sides across the direction. The movement prediction area $S(\theta)$ is provided such that as the angle $\theta$ from the global moving speed direction is larger, the absolute value of its directional component is smaller.

Figure 12:
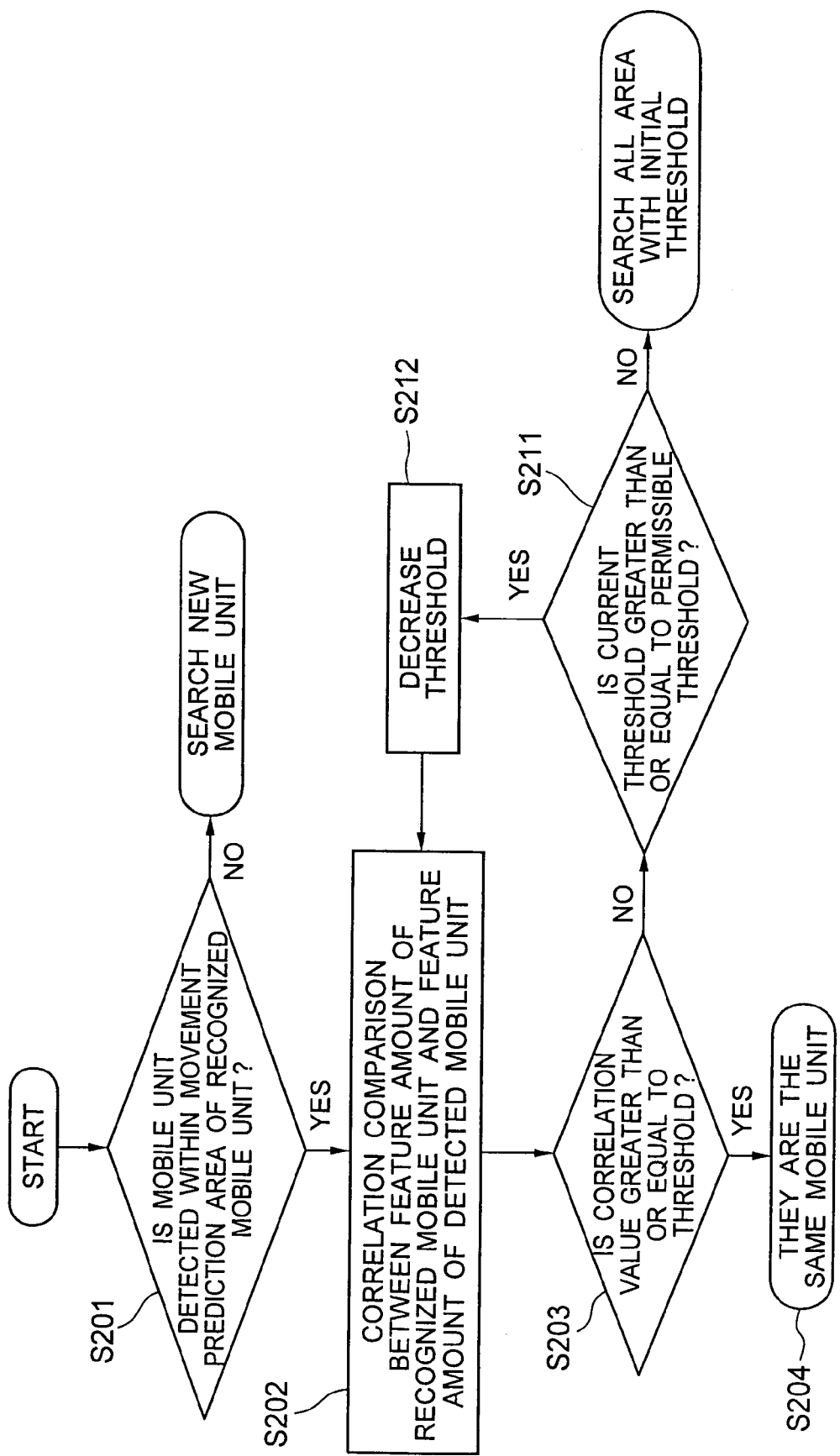
FIG. 12 is a flowchart showing a mobile unit searching process.

The tracking apparatus 121 uses the movement prediction area $S(\theta)$ as information for searching mobile units. FIG. 12 shows a flowchart for a mobile unit searching process. In detecting mobile units, if the tracking apparatus 121 detects a mobile unit 111 within the movement prediction area $S(\theta)$ of a previously recognized mobile unit 111 (S201), the tracking apparatus 121 preferentially makes a correlation comparison between the feature amount of the recognized mobile unit 111 and the feature amount of the detected mobile unit 111 (S202). This is because there is strong possibility that they are the same mobile unit 111. If the correlation value between these feature amounts is greater than or equal to a threshold (S203), it is judged that they are the same mobile unit 111 (S204). If the correlation value between these feature amounts is less than the threshold, the correlation comparison is made again with decreasing the threshold (S212) unless the threshold is less than a permissible threshold (S211).

Figure 13:
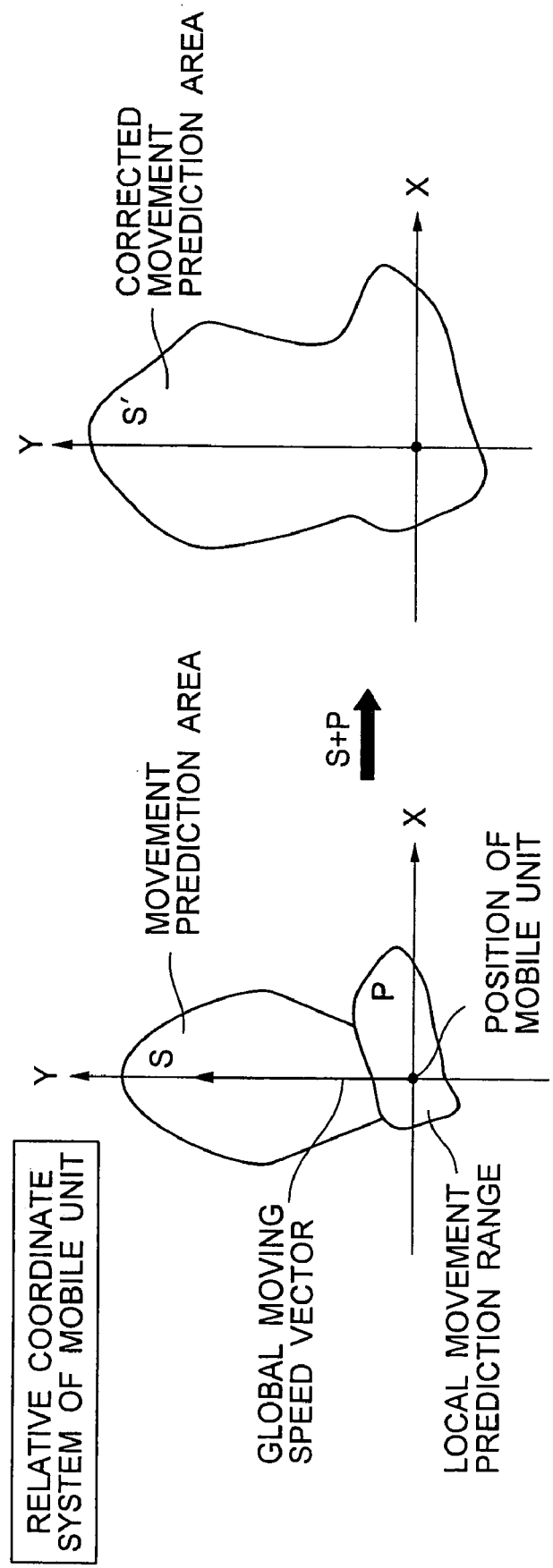
FIG. 13 is a view for explaining a corrected movement prediction area.

In the above-mentioned mobile unit searching process, the tracking apparatus 121 may use, instead of the movement prediction area $S(\theta)$, a corrected movement prediction area $S'(\theta)$, which is the movement prediction area $S(\theta)$ corrected by the local movement prediction range $P(\theta)$. Thereby, the mobile unit searching process is implemented by further considering the movement feature of each mobile unit 111. A calculation formula for the corrected movement prediction area $S'(\theta)$ is the following expression (9). FIG. 13 shows the corrected movement prediction area $S'(\theta)$.

$$S'(\theta)=S(\theta)+P(\theta) \qquad (9)$$

The tracking apparatus 121 can graphically display a behavior of movement of each mobile unit 111, on a monitor 171 of FIG. 1, using the time series data of positional data obtained by the position determination for each mobile unit 111. According to a displaying scheme, the two-dimensional virtual movement plane is displayed as shown in FIG. 7B or 8B, and the symbol (e.g., "point") denoting each mobile unit 111 is displayed at the position derived from the positional data of each mobile unit 111. A supervisor of this system can graphically grasp the trend of guests, robots, and shopping carts within the shop by monitoring on the monitor 171.

At this time, the tracking apparatus 121 can display the calculated local moving speed vector $V_{micro}$, global moving speed vector $V_{macro}$, complex mobility U, local movement prediction range $P(\theta)$, and movement prediction area $S(\theta)$, along with the behavior of movement of each mobile unit 111, on the monitor 171 of FIG. 1. The displaying scheme of them may be simple numerical indication, or graphical representation as described above. According to an example of the graphical representation, they are displayed in the form as shown in FIGS. 10 and 11. The supervisor of this system can predict how each mobile unit 111 moves within the shop by monitoring on the monitor 171. Thereby, it is possible to prevent collision of a guest with a robot owing to the action of the supervisor, for example.

The tracking apparatus 121 here outputs the behavior of movement of each mobile unit 111 and the movement feature amounts (prediction data) to a local user interface (the monitor 171 of the tracking apparatus 121), but it may output them to a remote user interface.

The tracking apparatus 121 can output the time series data of positional data obtained by the position determination for each mobile unit 111, and the calculated local moving speed vector $V_{micro}$, global moving speed vector $V_{macro}$, complex mobility U, local movement prediction range $P(\theta)$, and movement prediction area $S(\theta)$, to the outside via a communication interface. The notification to the robot and the output to the remote user interface correspond to examples thereof. Examples of the communication interface include a wire LAN interface, a wireless LAN interface, and a USB interface. As an example of the communication path on which the positional data and the movement feature amounts (prediction data) are outputted, a network 172 is shown in FIG. 1.

Each robot 111B moving autonomously within the shop is provided with a plurality of infrared radiation emitting devices for repeatedly emitting light in specific flashing pattern, and a plurality of markers drawn in specific color and pattern. Each robot 111B is provided with an enough number of infrared radiation emitting devices and markers to ascertain the robot 111B in any direction within the shop. The tracking apparatus 121 possesses the light emitting pattern and the marker feature of each robot 111B as known information. When a certain light emitting pattern or marker feature is detected, the tracking apparatus 121 specifies the corresponding robot 111B, and judges that intervention into the moving operation of the robot 111B is possible. For an intervention command and intervention method for intervening in the motion, it is supposed to use a command and method which are made consistent between the tracking apparatus 121 and the robot 111B beforehand.

Figure 14:
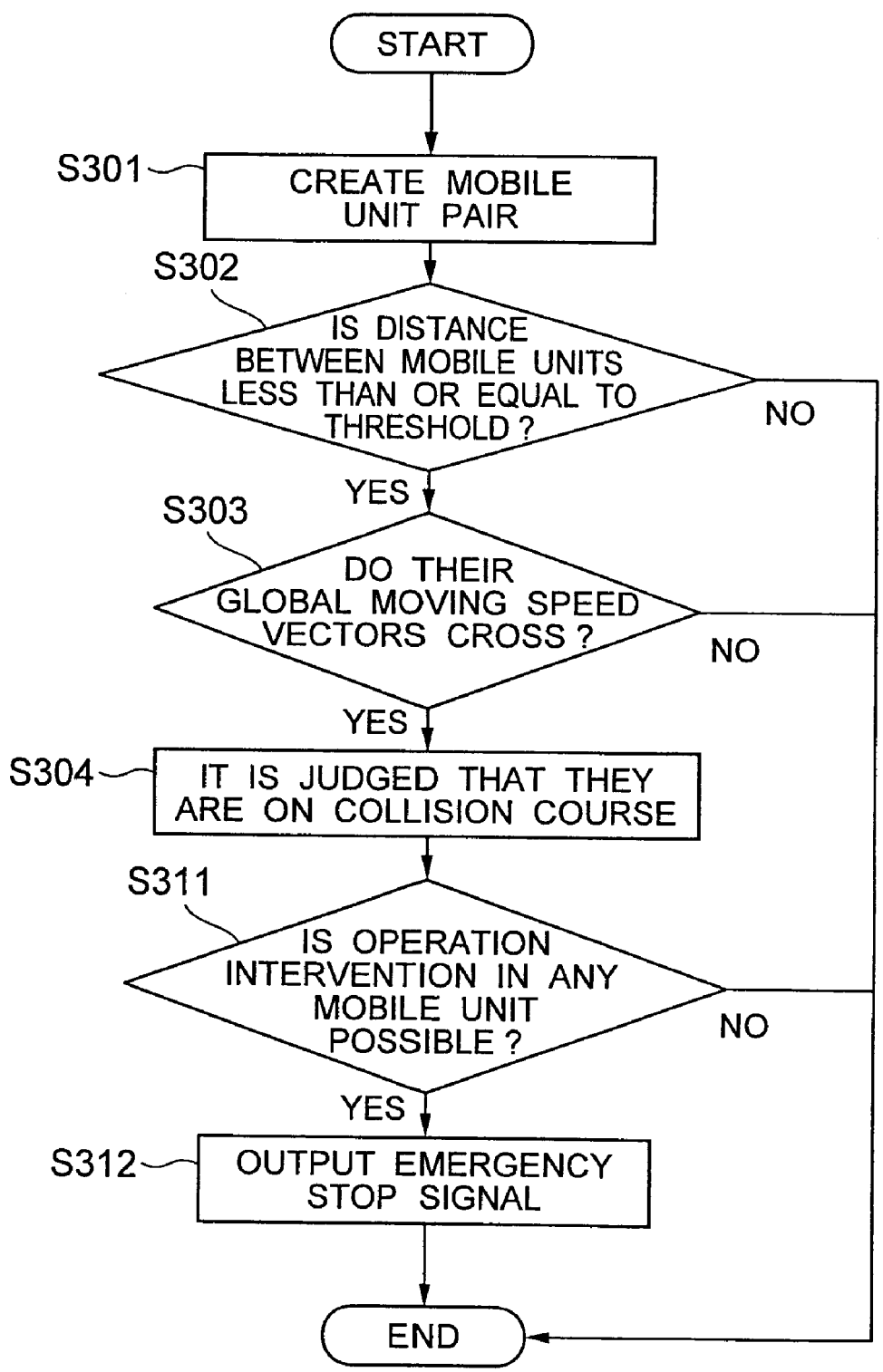
FIG. 14 is a flowchart showing an intervention process.

Referring to FIG. 14, an intervention process performed by the tracking apparatus 121 will be described below. FIG. 14 is a flowchart for the intervention process.

The tracking apparatus 121 selects mobile units 111 located adjacently, using the stored positional data, and manages them as a mobile unit pair (S301). Then, if the distance between these mobile units 111 is smaller than or equal to a threshold (S302), and if the global moving speed vectors of these mobile units 111 cross each other (S303), the tracking apparatus 121 judges that these mobile units 111 are on a collision course (S304). At this time, if at least one of these mobile units 111 is capable of operation intervention (S311), the tracking apparatus 121 outputs an emergency stop command to at least one of these mobile units 111 (S312). That is, the operation intervention is performed. The mobile unit 111 receiving the emergency stop command is decelerated promptly and stops. Thereby, the collision between the mobile units 111 is avoided.

As described above, the tracking apparatus 121 intervenes in the movement operation of each robot 111B, according to a movement feature amount (prediction data) obtained for each robot 111B. In this embodiment, the intervention is performed through a socket communication via the network. Also, an emergency stop intervention may be performed by means such as an infrared remote controller with cord. Also, the intervention process of this embodiment is applicable to a mobile unit 111 such as a shopping cart heteronomously moving within the shop. For example, the shopping cart may be provided with a brake system with a wheel lock mechanism operating in response to an intervention signal. Also, to intervene in a person such as a clerk or worker, the person may carry an intercom or earphone generating a warning sound in response to an intervention signal. Further, a rotating lamp that flashes in response to an intervention signal may be provided at an essential point such as an intersection within the shop.

Both of the notification to the robot (autonomous mobile unit) and the operation intervention can suppress a danger of approach or collision between the robot and another mobile unit while keeping the movement efficiency of the robot. A difference between the notification and the operation intervention is that the subject for judging the danger is typically the robot in the former case, whereas the subject for judging the danger is typically the tracking apparatus in the latter case. The processing load of the tracking apparatus is reduced in the former case, whereas the processing load of the robot is reduced in the latter case.

What is claimed is:

1. A tracking method comprising:
   detecting a mobile unit within a space;
   tracking the detected mobile unit;
   making a position determination of the tracked mobile unit to obtain positional data; and
   making a movement prediction of the tracked mobile unit, based on a high frequency component and a low frequency component of the positional data, wherein the movement prediction is made based on a differential amount of the high frequency component, and an angle between a differential amount of the high frequency component and a differential amount of the low frequency component.

2. The method according to claim 1, wherein the detecting comprises detecting the mobile unit within the space, using an image obtained by imaging the mobile unit.

3. The method according to claim 2, wherein the detecting comprises detecting the mobile unit within the space, through a difference process between the image obtained by imaging the mobile unit and a reference image for the difference process.

4. The method according to claim 2, wherein the making of a position determination comprises deciding a representative point in an image area where the mobile unit is detected from the image, and determining the representative point as the position of the mobile unit.

5. The method according to claim 4, wherein the making of a position determination comprises deciding a point nearest to the lower end of the image in the image area, as the representative point.

6. The method according to claim 4, wherein the making of a position determination comprises deciding a point nearest to the center of the image in the image area, as the representative point.

7. The method according to claim 1, wherein the detecting comprises detecting the mobile unit within the space, using a signal transmitted from the mobile unit.

8. The method according to claim 1, wherein high pass positional data obtained by filtering the positional data through a high pass filter is used as the high frequency component.

9. The method according to claim 8, wherein the high pass filter is of a sequential or recursive computation type.

10. The method according to claim 1, wherein low pass positional data obtained by filtering the positional data through a low pass filter is used as the low frequency component.

11. The method according to claim 10, wherein the low pass filter is of a sequential or recursive computation type.

12. The method according to claim 1, further comprising:
    extracting a motion feature amount of the tracked mobile unit;
    filtering the motion feature amount through a frequency filter; and
    distinguishing multiple mobile units, based on the motion feature amount filtered through the frequency filter.

13. The method according to claim 12, wherein the extracting comprises extracting an optical flow of the tracked mobile unit, as the motion feature amount of the tracked mobile unit.

14. The method according to claim 13, wherein the distinguishing comprises distinguishing multiple mobile units, based on an angle of the optical flow.

15. The method according to claim 1, further comprising:
    outputting movement prediction data, via a user interface or via a communication interface, or notifying the movement prediction data to a mobile unit that comprises an autonomous mobile unit.

16. The method according to claim 1, further comprising:
    intervening in a movement operation of the tracked mobile unit, according to the movement prediction.

17. A tracking apparatus comprising:
    a detection unit configured to detect a mobile unit within a space;
    a tracking unit configured to track the detected mobile unit;
    a determination unit configured to make a position determination of the tracked mobile unit; and
    a prediction unit configured to make a movement prediction of the mobile unit, based on a high frequency component and a low frequency component of positional data obtained by the position determination, wherein the prediction unit makes the movement prediction based on a differential amount of the high frequency component, and an angle between the differential amount of the high frequency component and a different amount of the low frequency component.

18. The apparatus according to claim 17, further comprising:
    an extraction unit configured to extract a motion feature amount of the tracked mobile unit;
    a filtering unit configured to filter the motion feature amount through a frequency filter; and
    a distinguishing unit configured to distinguish multiple mobile units, based on the motion feature amount filtered through the frequency filter.

* * * * *